April 5, 1949.  D. ROEDER ET AL  2,466,328
COOLING ARRANGEMENT FOR SPEED GOVERNORS
Filed June 26, 1944

D. Roeder
H. L. Brock
INVENTORS

BY Edwin C. McRae
R. G. Harris

Patented Apr. 5, 1949

2,466,328

UNITED STATES PATENT OFFICE 2,466,328

COOLING ARRANGEMENT FOR SPEED GOVERNORS

Dale Roeder, Wayne, and Harold L. Brock, Detroit, Mich., assignors to Ford Motor Company, Dearborn, Mich., a corporation of Delaware Application June 26, 1944, Serial No. 542,108

1 Claim. (Cl. 123—198)

This invention relates to internal-combustion engine vehicles; and, more particularly, to a system of engine ventilation applied to agricultural tractors and other vehicles operating under similar conditions.

The object of this invention is to provide a new method and device for ventilating not only the crankcase of an engine but providing positive ventilation of the ignition distributor and engine governor as well. More specifically, the apparatus of the present invention includes a positive delivery air pump which is operated to force a stream of dry, clean air continuously through the distributor and engine crankcase to perform the triple function of preventing condensation in the distributor, cleaning the governor and of ventilating the crankcase. Alternatively, the device may be arranged to by-pass the distributor and serve primarily as an engine ventilator and governor cleaner. A further object is to devise an apparatus capable of performing the above functions which will be compact in form and dependable in operation. A further object is to devise an arrangement of the respective accessories of the engine together with the apparatus to provide for maximum efficiency in operation. A further object is to devise a combined accessory unit to the standard engine embodying the ventilating apparatus and avoiding the use of auxiliary drive connections to the engine.

The advantage of the present construction is that not only is a current of ventilating air established through the crankcase—the benefits of which have been sought in previous arrangements—but also the interior of the governor is scoured and an auxiliary current of dry, clean air may be directed to the interior of the engine ignition distributor. The conditions under which such vehicles as agricultural tractors operate are extremely severe so far as moisture and dust are concerned. The speed of operation is necessarily low, so that the current of air generated by the movement of the vehicle is not sufficient to remove products of condensation from the engine and its accessories. At the same time, the operation of the vehicle creates a great deal of dust, which—because of the low speed—is deposited on the engine and its auxiliaries. These combined factors make the provision of adequate crankcase and governor ventilation and means for removing products of condensation from the distributor particularly urgent. Moreover, for best results, positive air displacement means is necessary in the combination. As appears from the following description, the clean air to be circulated is withdrawn from the carburetor intake supply intermediate the air cleaner and the carburetor. It is then conducted to the suction intake of positive displacement pump and from there delivered to the interior of the governor, which—in turn—opens to the interior of the engine crankcase and from which the air is exhausted through the oil breather cap completing the circuit. The source of the air is, of course, affected by the varying manifold pressures in the engine. Moreover, the engines usually used on agricultural tractors are of the four-cylinder type which, in themselves, have considerable volumetric capacity as an air pump. If air from the crankcase is forced by reverse flow into the distributor or governor, serious consequences may accrue and the deleterious effects multiply. It is, therefore, essential that a positive displacement pump be used as the supplying mechanism for insuring the proper flow of the ventilating air.

With these and other advantages in view, the invention consists in the construction and system described in the specification, claimed in the claims and shown in the accompanying drawings in which:

Figure 1:
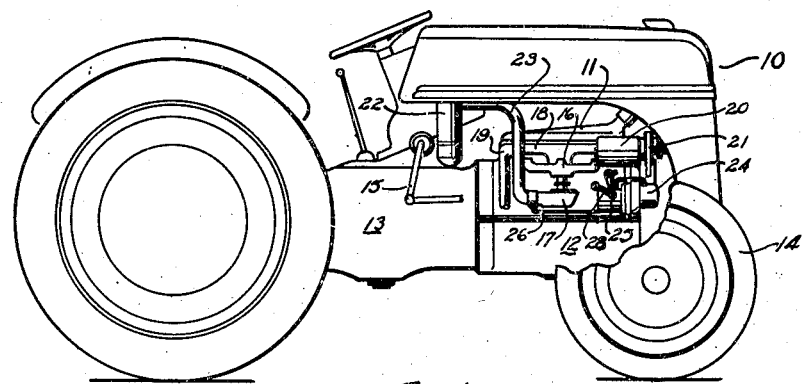
Figure 1 is an elevation of an agricultural tractor employing this system.

Referring to Figure 1, 10 indicates an agricultural tractor of the Ford type having an internal-combustion engine 11 with a crankcase 12 and an attached transmission housing 13. A portion of the front wheel 14 and the steering linkage 15 is broken away to show the engine auxiliaries referred to later. The engine has an intake manifold 16 connected with a carburetor 17 and exhaust manifold 18 normally discharging through the exhaust pipe 19, only a portion of the latter being shown. A generator 20 is attached to the engine block and driven through a belt 21 in the usual manner from an engine crankshaft pulley. Here again, a part of the mechanism is omitted in the interest of clarity.

An air cleaner 22 provides air for combustion to the carburetor 17 through the pipe 23. An ignition distributor 24 is secured to the front face of the engine block and is directly driven from the engine camshaft. A combined governor and positive displacement fan unit 25, is also attached to the block adjacent the distributor and, in one embodiment, a duct 26 leads from the pipe 23 intermediate the air cleaner 22 and the carburetor 17 to the suction intake 27 of the assembly 25, and a second duct 28 leads from the interior of the governor chamber to the distributor 24.

Figure 2:
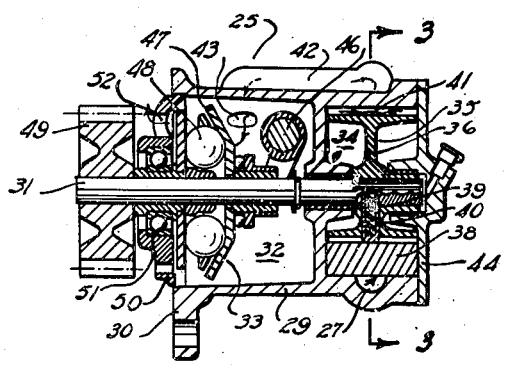
Figure 2 is a transverse vertical section through the combined governor and ventilating device which forms the structure of this invention.
Figure 3:
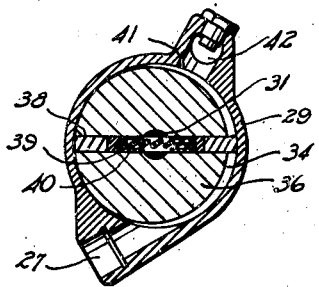
Figure 3 is a section taken on the line 3—3 of Figure 2.
Figures 4, 5:
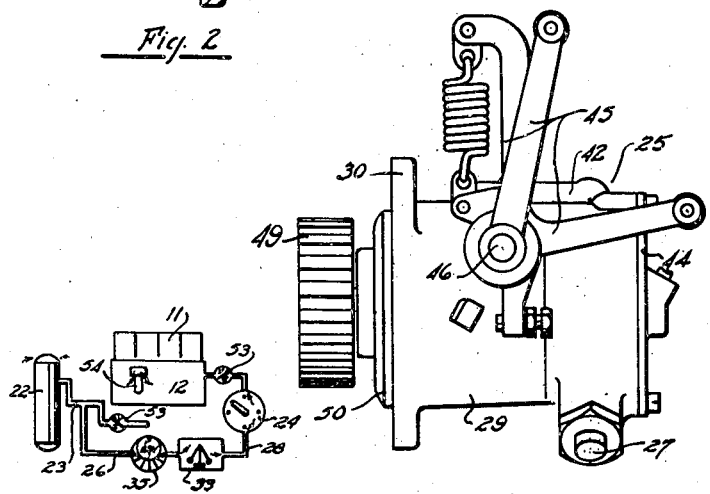
Figure 4 is an elevation of the above-described unit.
Figure 5 is a schematic diagram of the air flow.

Figures 2, 3, and 4 show the specific construction of one form of the assembly 25. This includes a substantially cylindrical housing 29 having a face plate 30, by which it is secured to the engine block and through which a shaft 31 is journaled. The interior of the housing 29 is separated into two compartments: one, the forward compartment 32 encloses the engine governor assembly 33 mounted on the shaft 31, and the rearward compartment 34 encloses a positive displacement fan assembly 35. The fan consists of the rotor 36 splined to the shaft 31 and carries a pair of radially slidable blades 38, which are continuously urged into contact with the inner wall of the compartment 34 by the spring 39 in the retainers 40. The suction intake 27, referred to above, leads to the lower portion of the chamber 34 and discharge is effected through the upper port 41, communicating with the integrally formed duct 42, which discharges at 43 to the interior of the governor chamber 32. A plate 44 completes the closure of the fan assembly chamber 34 and also supports a journal for the rear end of the shaft 31. Externally of the device are located the usual governor control levers 45 mounted on the transverse shaft 46 and actuated by longitudinal movement of the carriage 47, in response to radial displacement of the balls 48 as the rotative speed of the shaft 31 changes. A gear 49 attached to the forward end of the shaft 31 meshes, as is the usual practice, with the engine camshaft. An end plate 50 completes the closure of the governor chamber 32 and supports the bearing 51 for the shaft 31. This plate is traversed by a number of apertures 52 in one form of the invention by means of which the air is forced into the interior of the compartment 32 through the discharge port 43 and may be circulated directly to the interior of the crankcase 12 by-passing the distributor. In another form, the end plate may be imperforate and instead of exhausting the air to the crankcase, it is directed to the distributor 24 as indicated in Figure 5. Or, as a further alternative, the fan may discharge directly through the upper port 41 to the duct 28 as shown in Figure 1, by-passing the governor. However, if the distributor forms a part of the ventilated circuit, provision must be made so that inflammable gases will not reach it since they would be ignited by the sparks at the breaker arm contacts with explosive effect. This, as shown in Figure 5, is accomplished by inserting check valves 53, preventing reverse flow from the carburetor or crankcase. In addition, this view indicates the termination of the cycle through the oil filler pipe 54.

Thus, a constant stream of air is forced through the governor chamber, the distributor and the interior of the crankcase, maintaining the internal pressure—well above atmospheric—while the engine is operating and preventing the entrance of dust or dirt from the exterior or the condensation of moisture in these elements. The directly connected, positive displacement pump is operating whenever the engine is functioning, so that there is no opportunity for a substantial reverse flow to be established, extending the crankcase atmosphere to the interior of the distributor or governor. In this manner alone, the pumping action, due to the displacement of the engine, can be overcome and the ventilating characteristics are no longer dependent upon the motion of the vehicle itself.

The unit, as described, is self-sustained and reliable and requires no structural change in the tractor, as such. It employs a common drive with the governor and its means of attachment is the same as that of the governor. While it utilizes the capacity of the existing engine air cleaner it is not, of course, affected by the varying manifold pressure as were other devices heretofore used, which did not employ a positive displacement pump.

Certain changes may be made in the construction of the device shown without departing from the spirit of the invention, and it is the intention to cover by the claim such changes as may reasonably be included therein.

The invention claimed is:

A unitary auxiliary device for an internal combustion engine comprising, a substantially cylindrical housing transversely partitioned into two chambers having end walls, a shaft journalled longitudinally in and extending through one of said end walls, a driving gear secured to said extended end, the chamber remote from said driving gear being cylindrical and concentric with said shaft, a rotor mounted eccentrically on said shaft in said last mentioned chamber, a plurality of radially slideable blades mounted in said rotor, resilient means urging said blades into contact with the walls of said last mentioned chamber, an engine speed centrifugal governing mechanism including a fly ball mechanism mounted on said shaft in the other of said chambers between said cylindrical chamber and the end wall of said housing adjacent said driving gear, an air supply port opening into said cylindrical chamber, a delivery port from said cylindrical chamber discharging into the other of said chambers on one side of said governing mechanism, a discharge port in the wall of said housing adjacent said driving gear on the opposite side of said fly ball mechanism whereby air is circulated longitudinally through said governing mechanism.

DALE ROEDER.
HAROLD L. BROCK.

REFERENCES CITED

The following references are of record in the file of this patent:

UNITED STATES PATENTS

| Number | Name | Date |
|---|---|---|
| 1,777,319 | MacPherson | Oct. 7, 1930 |
| 1,778,036 | Noble et al | Oct. 14, 1930 |
| 1,847,457 | Zeibig et al. | Mar. 1, 1932 |
| 2,149,516 | Flamm | Mar. 7, 1939 |
| 2,271,150 | Dressler | Jan. 27, 1942 |
| 2,359,485 | Lowther | Oct. 3, 1944 |